United States Patent [19]

Haase

[11] 4,378,292

[45] Mar. 29, 1983

[54] FIXED BED MULTIPLE ZONE FLUID-SOLIDS CONTACTING APPARATUS

[75] Inventor: Michael E. Haase, Des Plaines, Ill.

[73] Assignee: UOP Inc., Des Plaines, Ill.

[21] Appl. No.: 301,068

[22] Filed: Sep. 11, 1981

[51] Int. Cl.³ .............................................. B07B 1/28
[52] U.S. Cl. ..................... 210/266; 55/389; 55/476; 55/518; 210/284; 210/285; 422/191; 422/194; 422/195; 422/220
[58] Field of Search ................................ 55/387–389, 55/476, 518; 261/113; 210/269, 266, 284, 285, 264; 422/191, 194, 195, 220; 127/9, 46.2, 46.3; 34/195, 197

[56] References Cited

U.S. PATENT DOCUMENTS

| | | | |
|---|---|---|---|
| 2,317,449 | 4/1943 | Flock | 23/288 |
| 2,369,478 | 2/1945 | Mekler et al. | 23/288 |
| 3,214,247 | 10/1965 | Broughton | 23/288 |
| 3,523,762 | 8/1970 | Broughton | 23/285 |
| 3,598,541 | 8/1971 | Hennemuth et al. | 23/288 |
| 3,598,542 | 8/1971 | Carson et al. | 23/288 |
| 3,789,989 | 2/1974 | Carson | 210/284 |

Primary Examiner—Bernard Nozick
Attorney, Agent, or Firm—James R. Hoatson, Jr.; John F. Spears, Jr.; William H. Page, II

[57] ABSTRACT

A fluid-solids contacting apparatus which is useful in simultaneously contacting several different liquid streams with different parts of a fixed bed of solid material is disclosed. The apparatus comprises an imperforate centerpipe mounted in an outer vessel with discoid layers of fluid distributor pans being suspended from the centerpipe and the vessel. A fluid may be added or withdrawn at any layer through horizontal conduits leading to annular distribution rings mounted on the centerpipe, with smaller pipes branching radially from the distribution rings to the individual distributor pans. Each distributor pan comprises an upper and lower horizontal particle retaining screen and two flat flow diversion plates which force the fluid to flow to a central mixing area between the plates and at which the smaller pipe connects with the distributor pans. The distributor pans thereby serve to mix and redistribute fluids flowing vertically through the apparatus.

11 Claims, 5 Drawing Figures

FIXED BED MULTIPLE ZONE FLUID-SOLIDS CONTACTING APPARATUS

FIELD OF THE INVENTION

The invention relates to an apparatus useful for contacting fixed beds of solid materials with a fluid. The invention is directly related to an apparatus for use in contacting a flowing liquid stream with an absorbent or adsorbent as in an adsorptive separation process. The invention is specifically directed to fluid distributor-collector devices which are placed at several intermediate points in a cylindrical bed of solid material to allow the addition or withdrawal of a liquid stream at any of these several points. The same fluid distributor-collectors also mix any fluid traveling vertically through them between different layers of the solid material. The invention therefore also relates to apparatus for mixing a liquid flowing vertically through a packed column to ensure a uniform liquid composition at different radial distances from the center of the column.

PRIOR ART

Fluid-solids contacting apparatus are in widespread commercial use as reactors and as adsorption zones. These devices are normally cylindrical columns containing a cylindrical mass of the solid contact material. The solid contact material may be catalyst or solid adsorbent. The fluid flows through the cylindrical mass of solids along the major axis of the column and may flow from one end of the column to another or from one intermediate point in the column to another. To maximize the effectiveness of the intended operation, the fluid should have a uniform composition and flow rate at all points across the cross section of the column. In order to counteract the natural tendency of fluids to depart from this desired "plug flow", there have been developed devices for remixing the fluids as they travel along the length of the column. The most pertinent of these remixing devices is believed to be that shown in U.S. Pat. No. 3,523,762.

In some fluid-solids contacting columns, especially those used to simulate the movement of the bed of solids, there are provided one or more fluid feed or withdrawal points located intermediate the ends of the column. At these points it is desired to respectively disperse or collect across the entire cross section of the column any fluid which is added or withdrawn at one of these points. It is also desired to remix fluid flowing through the column at these points when no fluid is being added or withdrawn. The apparatus shown in U.S. Pat. No. 3,214,247 performs both of these desired functions and is believed to be pertinent for its structure. The structure of this device includes horizontal upper and lower particle retaining screens and two horizontal imperforate flow diversion plates located between the screens. Fluids are added or withdrawn at a central gap between the flow diversion plates through the use of a conduit extending in through the side of the outer vessel. This device is intended for use in adsorption columns.

U.S. Pat. Nos. 3,598,541 and 3,598,542 are directed to fluid contacting devices designed for the addition of a fluid at an intermediate point in a process vessel. These devices are basically directed to the addition of cold quench vapors to downward flowing fluids in high temperature reactors.

U.S. Pat. Nos. 2,317,449 and 2,369,478 illustrate fixed bed non-radial flow reactor designs using a centerpipe. The catalyst is retained within horizontal layers in means supported by the outer wall of the vessel. The centerpipe collects fluids which have passed through the catalyst.

BRIEF SUMMARY OF THE INVENTION

The invention provides a fluid-solids contacting apparatus which is especially adapted for use in large diameter vertical columns containing a solid adsorbent. It is particularly adapted for utilization in columns in which a vertical cylindrical bed of adsorbent is divided into a large number of zones by means to admix, add or withdraw a fluid to facilitate the movement of adsorption and desorption zones within the bed to simulate a moving bed of the adsorbent. The apparatus is believed to have novel features present in both the horizontal layers of fluid distributor pans which are hung within the vessel and also in the fluid distribution means which is used to transfer fluids to and from the fluid distributor pans.

One broad embodiment of the invention may be characterized as a fluid-solids contacting apparatus which comprises an enclosed outer vessel having a vertical major axis and comprising a cylindrical vertical outer wall; a vertical centerpipe located within the outer vessel and aligned with the major axis of the outer vessel; a plurality of vertically spaced apart horizontal layers of fluid distributor pans, each layer being in the form of a flat ring extending between the centerpipe and the vertical outer wall of the vessel; beds of solid particles located between the layers of fluid distributor pans; a plurality of annular fluid distribution rings mounted on the centerpipe at points intermediate vertically adjacent layers of fluid distributor pans; a plurality of fluid distribution pipes with one pipe extending from each fluid distributor pan to an annular fluid distribution ring located above the fluid distributor pan, and fluid transfer conduits extending substantially horizontally from the annular fluid distribution ring to points outside of the outer vessel. Preferably each fluid distributor pan has a wedge-shaped structure and comprises two imperforate side plates extending between the centerpipe and the horizontal outer wall; an upper screen extending horizontally from side to side between the side plates; a lower screen extending horizontally from side to side between the side plates and a first and a second imperforate flow diversion plates extending horizontally from side to side between the side plates and located between the first and the second screens in the same horizontal plane, with the first and second flow diversion plates being separated by a substantially uniform gap which extends from side to side across the fluid distributor pan at a point at which a fluid distribution pipe communicates with the fluid distributor pan.

DETAILED DESCRIPTION

Figure 1:
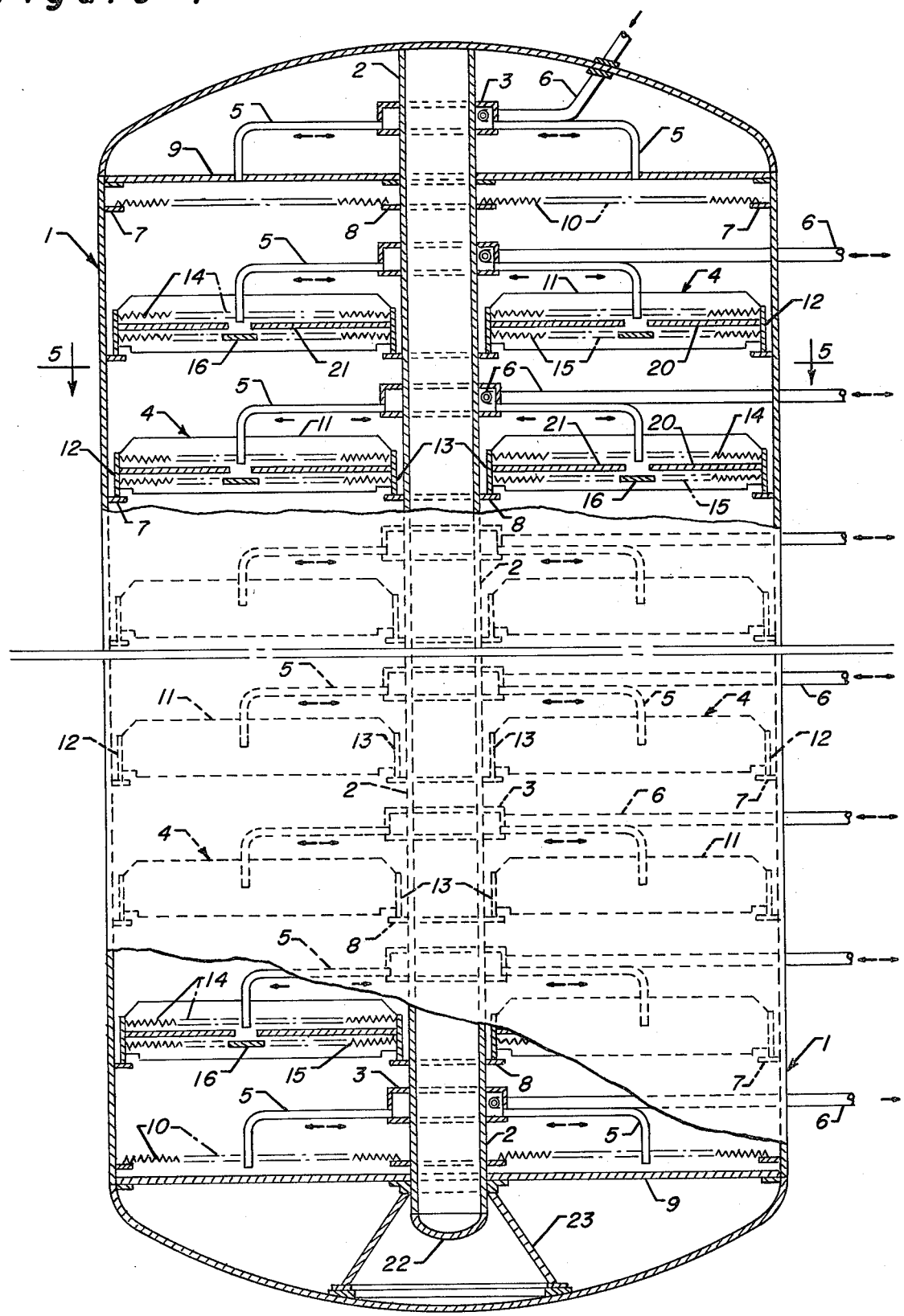
FIG. 1 is a cross section of an apparatus built according to the subject invention through a vertical plane through the vertical axis of the outer vessel 1.

The subject invention may be applied by any process in which it is necessary to contact a segmented cylindrical bed of a solid material, which may be either a catalyst, an immobilized enzyme, or an adsorbent, with a fluid. The fluid may be either a gaseous mixture or a liquid, but the invention is not intended for use with mixed phase flows and the utilization of liquid-phase conditions is preferred. It is specifically intended that the subject invention is utilized in a separation process in which an incoming feed stream containing at least two different chemical compounds or two different isomers of a single compound are passed through a fixed bed of a material which selectively adsorbs one of the two chemical compounds or isomers. The majority of the description of the subject invention will therefore be cast in terms of a separatory process although the invention is applicable to most all liquid-solids contacting operations. A preferred utilization of the subject apparatus is in a process in which the movement of the bed of selective adsorptive material is simulated to obtain the effects of the countercurrent flow of the bed of solid material and various entering fluid streams such as the feed and desorbent streams. This simulation is performed in part by the periodic movement of the location of various zones, such as the adsorption zone, along the length of the bed of adsorbent. This movement of the location of the various zones is performed gradually in a unidirectional pattern by periodically advancing the points at which the entering streams enter the adsorbent bed and the points at which the effluent streams are withdrawn from the adsorbent bed. It is only the location of the zones as defined by their respective feed and withdrawal points along the bed of adsorbent which are changed. The adsorbent bed itself is fixed and does not move.

It is important to the successful operation of such a simulated moving bed process that the fluid flows through the bed of adsorbent with a "plug flow" flow regime. That is, it is desired for the entire cross section of the adsorbent bed to be evenly swept by the flowing fluid, with the fluid having a uniform velocity and composition at all different points across the entire cross section of the bed. The separational abilities and capacity of any particular adsorbent bed is in part governed by the degree of uniformity of the vertical fluid flow through the bed since nonuniform flow can lead to backmixing, poor utilization of the adsorbent in some areas of the bed, and a dilution of the streams withdrawn from the bed with undesired materials which are also present in the process such as raffinate or desorbent materials.

The separation of various hydrocarbonaceous compounds through the use of selective adsorbents is widespread in the petroleum, chemical and petrochemical industries. Adsorption is often utilized when it is more difficult or expensive to separate the same compounds by other means such as fractionation. Examples of the types of separation which may be performed using selective adsorbents include the separation of ethylbenzene from a mixture of xylenes, unsaturated fatty acids from saturated fatty acids, acyclic olefins from acyclic paraffins, normal paraffins from isoparaffins, and a particular xylene isomer such as paraxylene from a mixture of $C_8$ aromatics. Typically, the selectively adsorbed materials have the same number of carbon atoms per molecule as the non-selectively adsorbed materials and have very similar boiling points. Another common application of adsorptive separation is the recovery of a particular class of hydrocarbons from a broad boiling point range mixture of two or more classes of hydrocarbons. An example is the separation of $C_{10}$–$C_{14}$ normal paraffins from a mixture which also contains $C_{10}$–$C_{14}$ isoparaffins.

Adsorptive separation processes require the sequential performance of three basic steps. First, the adsorbent must be brought into contact with a feed stream comprising the particular compounds to be collected at adsorption-promoting conditions. This adsorption step should continue for a time sufficient to allow the adsorbent to collect a near equilibrium amount of the preferentially adsorbed compounds. The second basic step is the contacting of the adsorbent while it is bearing both the preferentially and non-preferentially adsorbed compounds with a material which displaces the latter from the adsorbent. The second step is performed in a manner which results in the adsorbent and the interstitial void spaces between adsorbent particles containing significant quantities of only the preferentially adsorbed feed component and the material used to displace the non-preferentially adsorbed compounds. The third basic step of the adsorptive separation process is the desorption of the preferentially adsorbed compounds. This may be performed by changing the conditions of temperature and pressure, but in the simulated moving bed process is performed by contacting the adsorbent with a desorbent stream. The desorbent stream contains a chemical compound capable of displacing or desorbing the preferentially adsorbed compounds from the adsorbent to thereby release these compounds and prepare the adsorbent for another adsorption step. For instance, in the separation of monosaccharides water may be used as the desorbent.

The bed of adsorbent used in a separation process may be contained in a single vessel or in two or more interconnected vessels. The vessels are preferably vertically aligned although horizontal vessels could potentially be used with vapor phase fluid streams. At a large number of points along the length of the adsorbent bed, the appropriate openings and conduits are provided to allow the addition or withdrawal of fluid. At each of these points there is preferably provided a constriction of the cross section of the bed by a liquid distributor-collector which act in a manner similar to the layers of fluid distributor pans of the subject apparatus. Prior art apparatus for this purpose are shown in U.S. Pat. Nos. 3,208,833; 3,214,247 and 3,523,762. These distributor-collectors serve to aid in the establishment and maintenance of plug flow of the fluids along the length of the cylindrical bed of adsorbent.

A gradual and incremental movement of the adsorption zone, and the other zones utilized in a simulated moving bed process, is achieved by periodically advancing the actual points of fluid addition or withdrawal to the next available potential point. This change in the point of fluid transfer will occur at both the leading and trailing edge of each zone. That is, in each advance of a zone, the boundaries marking the beginning and the end of that zone will move by the relatively uniform distance between two adjacent fluid transfer points. The two points at which one of the primary streams, such as the feed or desorbent streams, enters the adsorbent bed and the corresponding effluent stream leaves the adsorbent bed are preferentially separated from each other by at least two or more potential fluid transfer points which are not being used. For instance, the feed stream may enter the adsorption zone at one point and flow past seven or more potential withdrawal points and through seven distributor-collectors before reaching the point at which it is withdrawn from the adsorbent bed as the raffinate stream. The periodic movement of the feed and withdrawal points of the corresponding streams therefore does not affect the major portion of the primary zones.

The switching of the fluid flows at these many different locations may be achieved through the use of a multiple-valve manifold or a multiple-port rotary valve. A central digital controller is preferably used to regulate the operation of the rotary valve or manifold. Further details on the operation of a simulated moving bed of adsorbent and the preferred rotary valves may be obtained from U.S. Pat. Nos. 2,985,589; 3,040,777; 3,192,954; 2,957,485; 3,201,491; 3,291,726 and 3,732,325.

The subject invention can be practiced using any type of commercially operable and practical selective adsorbent. The adsorbent may therefore be a naturally occurring substance or a manmade material and may be in the form of extrudates, pellets or spheres, etc. The adsorbent can be formed from charcoal, alumina, silica or various clays and mixtures of these materials. The preferred adsorbent comprises a shape selective zeolite commonly referred to as a molecular sieve. The term "shape selective" refers to the zeolite's ability to separate molecules according to size or shape because of the fixed and relatively uniform cross sectional diameter of the zeolite's pore structure. The preferred zeolites comprise synthetic crystalline aluminosilicates. Since the pure zeolites are relatively soft and powdery, the commercially used molecular sieves comprise a binder such as clay or alumina to produce a stronger and more attrition-resistant adsorbent particle. The adsorbent particles preferably have a size range of about 20 to about 40 mesh.

The particular adsorbent utilized in a separatory process will depend on the materials which it is desired to separate. For instance, type X or type Y zeolites which contain selected cations chosen from the Group I-A and Group II-A metals may be used to separate xylene isomers. The selective adsorption of olefinic hydrocarbons from saturated hydrocarbons may be performed using a copper exchanged type Y zeolite as described in U.S. Pat. No. 3,720,604. The adsorbents which are preferred for the separation of normal paraffinic hydrocarbons from isoparaffinic hydrocarbons have relatively uniform pore diameters of about 5 angstroms such as commercially available type 5A molecular sieves produced by the Linde Division of Union Carbide Corp.

In the particular case of the separation of a ketose from an aldose, it is preferred that a type X zeolite containing a cation chosen from Group II-A of the Periodic Table of Elements is employed as the adsorbent. It is preferred that the cations are chosen from barium and strontium. For the separation of fructose and glucose it is preferred to use a type X zeolite containing a cation pair selected from either barium and potassium or barium and strontium. More details on the separation of monosaccharides using simulated moving bed techniques may be obtained by reference to U.S. Pat. Nos. 4,226,639 and 4,226,977. The integration of this separatory technique into a process for the production of fructose is described in U.S. Pat. No. 4,206,284.

The subject invention is particularly directed to large processing units used to separate different components of water soluble natural substances such as the separation of fructose and glucose. These substances are normally processed as relatively high solids content liquids. This results in some of the process streams, especially the feed stream, being quite viscous as compared to the petroleum derived streams which are processed in the great majority of the prior art simulated moving bed systems. The large flow rates of these viscous streams and certain other design factors result in large diameter adsorption columns which may be more than 5 meters in diameter. It was observed that these factors lead to an increased tendency toward nonuniform fluid flow and maldistribution of the downward flow of high solids process streams. As previously stated an uneven flow across different parts of a bed of adsorbent results in a lowering of the optimum performance which may be achieved in terms of the balance between total adsorption and selectivity. It is therefore desirable for the flow rate and composition to be the same at all points across the cross section of an adsorbent bed.

It is an objective of the subject process to provide an apparatus and process for use in the simulated moving bed separation of different chemical compounds. It is a further objective to provide an apparatus for use as a very large flow rate simulated moving bed fluid-solids contacting apparatus. It is a specific objective of the invention to provide an apparatus for use as an adsorbent-liquid contacting device in a separation process having a high viscosity process stream and which provides effective admixing of process streams flowing through the device. Another objective of the invention is to provide an apparatus for use in a simulated moving bed process for the adsorptive separation of fructose and glucose.

The structure and operation of the subject invention may be best described by reference to the Drawing. FIG. 1 presents a cross sectional view taken through the vertical major axis of an apparatus built in accordance with the preferred embodiments set out herein. This view shows only a few of the many layers of horizontal fluid distributor pans which are used in an overall apparatus in order to present an expanded view of the apparatus. A commercial scale apparatus may have between 20 and 30 such layers of fluid distributor pans. The apparatus comprises a unitary outer vessel 1 which surrounds and encases the other components of the apparatus. The outer vessel comprises the lengthy cylindrical outer wall which is connected to eliptical upper and lower heads to thereby form a vessel which is substantially impervious to the flow of fluids except at points specifically designed to permit fluid flow. The major axis of the outer vessel is preferably vertical, although if all the process streams which are to pass through the vessel are vapor phase streams, then it may be possible to utilize the apparatus oriented in a horizontal plane.

The second major element in the overall apparatus is an imperforate centerpipe 2 which is concentric with the major axis of the outer vessel. This centerpipe, which could be formed from a number of shorter lengths of cylindrical shape which are joined or stacked together, need not extend from the top to the bottom of the outer vessel. It is sufficient for the centerpipe to extend the distance between the terminal layers of fluid distributor pans as described below. That is, in a vertical column it is only necessary for the centerpipe to extend upward from the bottom layer of fluid distributor pans to the top layer of fluid distributor pans. It is preferred that the bottom of the centerpipe be closed by a cap 22 and that the centerpipe be supported by a cone-shaped skirt 23 or similar means to spread the weight which the centerpipe supports across a larger area of the bottom of the vessel.

At the upper end of the vessel, a flat discoid plate 9 is fastened in place to seal the dome-shaped portion of the vessel from the lower working portion of the vessel in which the adsorbent is contained. This plate is utilized to prevent the flow of any process stream into the segregated void space thus formed at the upper end of the apparatus. In a similar manner, a second discoid imperforate plate 9 is located at the bottom of the vessel to seal off the lower dome-shaped volume. The lower plate may be supported by concrete poured into the lower end of the vessel to allow the use of a relatively thin plate. The annular volume located between these two plates is the working volume of the apparatus, and it is in this volume that the adsorbent or other solid particulate material is placed. At the upper and lower ends of the apparatus, a perforate particle-retaining screen 10 is provided to retain particulate material within the intermediate portion of the apparatus and to provide a shallow annular volume for the collection and distribution of the fluid streams which are fed to or removed from this terminal portion of the adsorbent bed.

The internal volume of the apparatus between the upper and lower plates 9 is divided into a number of annular particle retention zones by a plurality of layers of fluid distributor pans 4. Each layer is made up of a number of individual wedge-shaped pans 4 which are spread around the centerpipe in a circular pattern and which are supported at their inner first end by a support ring 8 fastened to the centerpipe 2 and at their outer second end by a support ring 7 attached to the inner surface of the cylindrical side wall of the outer vessel. Each layer of fluid distribution pans supports an annular bed of adsorbent which substantially fills the volume between vertically adjacent layers.

Process streams enter or exit the apparatus through a number of horizontal fluid transfer conduits 6 which extend from the appropriate piping and valve means outside of the vessel to a number of annular fluid distribution rings 3 which are mounted on the centerpipe. It is preferred that a single fluid transfer conduit communicates with each annular fluid distribution ring and that each fluid distribution ring is located above the layer of fluid distributor pans with which it is associated. Assuming for the moment that fluid is flowing into the vessel through a fluid transfer conduit 6, this fluid flows into the annular distribution ring which encircles the centerpipe and then flows radially outward through a sizable number of smaller diameter fluid transfer pipes 5. The flow through each of these pipes is first radially outward and then downward into the fluid distributor pans. The lower end of each fluid distribution pipe is in open communication with the internal volume of a fluid distributor pan. The fluid being passed into the vessel therefore flows into this internal point in the fluid distributor pan and is distributed from side to side within the pan by an outlet distributor attached to the lower end of the fluid distribution pipe. The fluid then flows horizontally to all points within the cross section of the pan. When a fluid stream is being withdrawn from the apparatus, the fluid flows through one of two particle retaining screens of the fluid distributor pans and flows to a central point in the pan at which there is communication with the fluid transfer pipe. The fluid then flows into the fluid transfer pipe and into the annular fluid distribution ring which channels fluids arriving from different fluid distribution pipes to the single horizontal fluid transfer conduit for removal from the apparatus. At the upper and lower ends of the apparatus, a full layer of fluid distributor pans is not provided and this function is performed by a single layer of the particle retaining screen 10 which is adjacent to the previously described plates 9.

Figure 2:
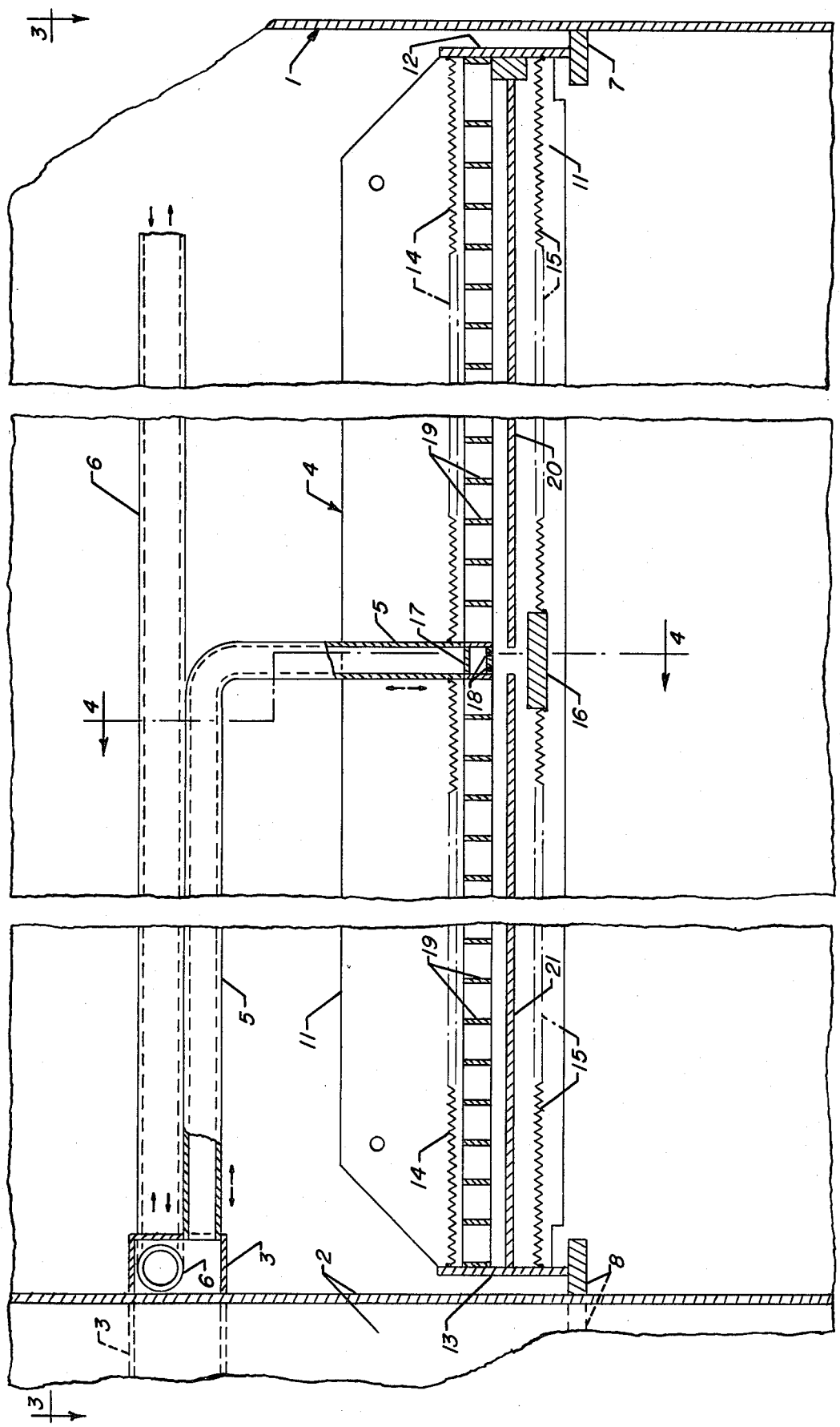
FIG. 2 is a cross section taken along a vertical plane cutting through the middle of a fluid distributor pan 4 and fluid distribution pipe 5.

Referring now to FIG. 2, a more detailed view of the cross section of a single fluid distributor pan 4 taken along a vertical plane through the center of the fluid distributor pan is provided. At the outer end of the distributor pan, a curved vertical end plate 12 rests upon a support ring 7 which is attached to the inside surface of the cylindrical wall of the outer vessel 1. At the inner end of the distributor pan, a second vertical end plate 13 rests upon a support ring 8 which is fastened onto the outside surface of the vertical centerpipe 2. The ends of the end plates are attached to side support plates 11 which extend from the inner (first) end to the outer (second) end of the distributor pan. These four support plates form a "wedge-shaped" box in which the remainder of the components of the distributor pan are located. This shape is actually a truncated wedge due to the end plate 13.

A large number of vertical screen support ribs 19 extend from side to side across the distributor pan and connect the two side support plates. It is preferred that the majority of these actually sit loose on support ledges on the side support plates. An upper particle retaining screen 14 extends horizontally across the support ribs 19, and a lower particle retaining screen 15 extends horizontally across the lower surface of the fluid distributor pan. The lower particle retaining screen is actually in two parts which are separated by a horizontal flow impact plate 16 which extends from side to side across the fluid distributor pan. This plate is located immediately below a gap which extends across the fluid distributor pan from side to side between the inner flow diversion plate 21 and an outer flow diversion plate 20. The flow diversion plates are flat horizontal imperforate members which extend across the entire cross section of the interior of the fluid distributor pan between the side support plates except for the gap which is allowed between their opposing edges above the flow impact plate 16. Immediately above this gap, there is located a rectangular box-like structure 17 which serves as a fluid distributor and which extends across the distributor pan from side to side. A number of relatively small holes 18 are located in the bottom of this distributor to cause fluids to uniformly flow into and from the distributor along the length of the distributor. The fluid distribution pipe 5 communicates with the distributor 17 through an opening in the top of the distributor. The other end of the fluid distribution pipe communicates with the annular fluid distribution ring 3 which is mounted on the centerpipe.

Again referring to FIG. 2, fluid flowing downward through the column would enter the fluid distributor pan through the upper particle retaining screen 14 and flow horizontally across the upper surface of the flow diversion plates 20 and 21 to the gap between these two plates. If no fluid is being added or withdrawn from the fluid distributor pan, then the fluid streams flowing horizontally at this point are admixed as they flow together at the gap and descend onto the flow impact plate 16. The fluids then spread out across the cross section of the fluid distributor pan in the volume provided under the flow diversion plate and above the lower particle retaining screen 15. In this way the fluid distributor pan serves as an intermediate stage mixing device which ensures that fluids flowing downward through the overall apparatus have a substantially uniform composition at all points across the cross section of the vessel.

The fluids mixed below the distributor 17 are free to move towards either the shell or the centerpipe of the apparatus. This complete mixing and redistribution of fluid and suspended solids entering anywhere on the side distribution pan is a major advantage of the apparatus. If a fluid stream is entering the vessel at the level of the fluid distributor pan, it would flow from the annular distribution ring through the fluid distribution pipe into the horizontal distributor 17. It is then spread across the gap through the holes in the bottom of the distributor and enters the overall flow in the grid. The fluid then flows downward through the gap into the space on both sides of the impact plate below the flow diversion plates. Because the pressure drop in the open area above the lower screen is relatively low there is good redistribution of the fluid before it enters the adsorbent through the lower screen. When a fluid stream is being withdrawn from the vessel, the fluids flow horizontally across the flow diversion plates to the gap and through the holes in the bottom of the distributor 17 and then into the distribution pipe 5.

Figure 3:
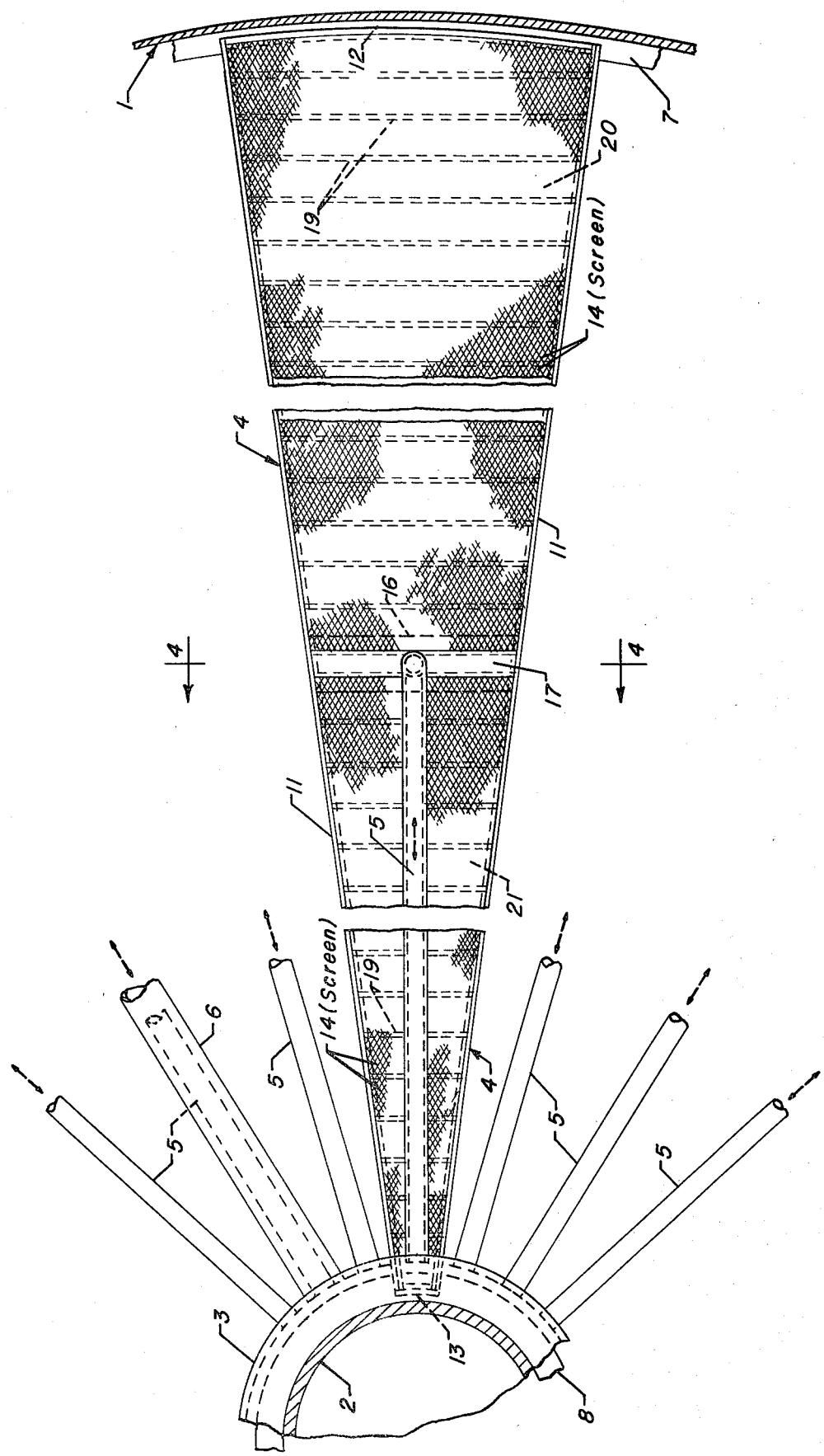
FIG. 3 is a cross sectional view of a portion of the apparatus taken along a horizontal plane 3—3 at a point above an annular fluid distribution ring 3 and looking downward at one fluid distributor pan.

FIG. 3 presents a cross sectional view looking downward upon a fluid distributor pan 4 which is suspended between the wall of the outer vessel 1 and the centerpipe 2. The larger fluid transfer conduit 6 carries fluid from a point outside the vessel to the annular fluid distribution ring 3 which is mounted on the centerpipe. The fluid may then flow outward through a fluid distribution pipe 5 to the distributor 17 which extends from side to side across the fluid distributor pan. As used herein the term "side to side" is intended to indicate a direction across the fluid distributor pan which is essentially perpendicular to a line drawn between the first end and the second end of the fluid distributor pan. The curved inner end plate 13 rests upon the flat support ring 8 which is fastened to the centerpipe below the distribution ring 3. The outer vertical end plate 12 rests upon the support ring 7 in a similar manner. The two side support plates 11 connect the two curved end plates to form the outline of a truncated wedge. The screen support ribs 19 extend from side to side between the side support plates 11. The upper particle retaining screen 14 is shown in a portion of the fluid distributor pan. This screen is not shown over all of the fluid distributor pan to allow a depiction of the imperforate flow diversion plates 20 and 21 which are located below it in the fluid distributor pan.

Figure 4:
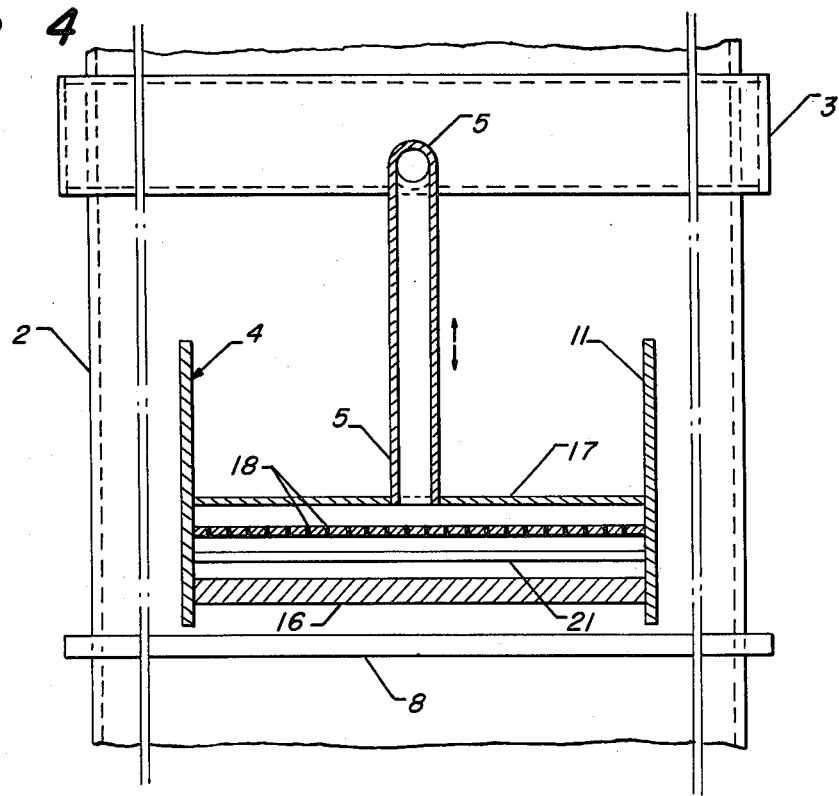
FIG. 4 is the view seen along a cross section taken through a vertical plane 4—4 at the point shown on FIG. 3 and depicts the elevational relationship between the fluid distributor pan and the annular fluid distribution ring which encircles the centerpipe.

FIG. 4 presents the view as seen looking inward horizontally toward the centerpipe 2 across a vertical plane through the distributor 17 of FIG. 3. The fluid distribution pipe 5 extends from the fluid distribution ring 3 to the internal volume of the distributor 17. The distributor 17 runs from side to side between the vertical side plates 11 with the holes 18 being spread across the lower surface of the distributor. The edge of the horizontal flow diversion plate 21 which faces the gap between the two diversion plates may be seen in this view. The flow impact plate 16 and the support ring 8 may also be seen in this view. The upper and the lower particle retaining screens are not seen in this view since they are located behind the distributor 17 and flow impact plate 16, respectively.

Figure 5:
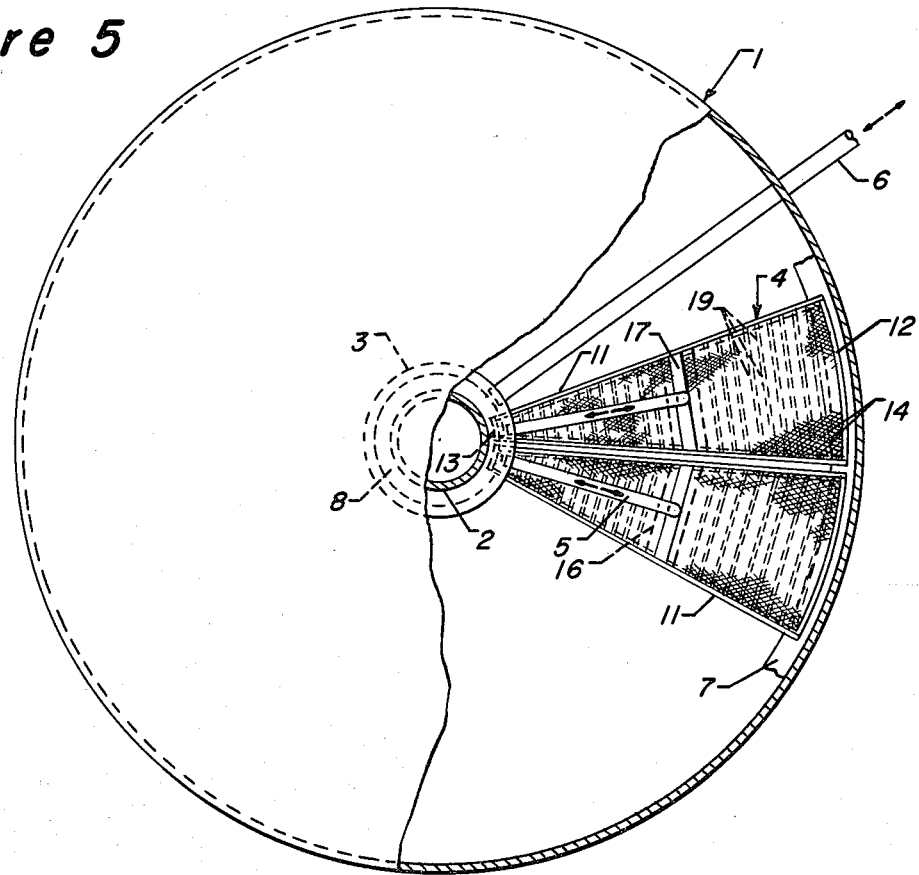
FIG. 5 is the view seen looking downward at a cross section taken on a horizontal plane at a point near the central portion of the overall apparatus and shows the discoid overall shape of a layer of fluid distributor pans extending between the centerpipe 2 and the inner surface of the outer vessel.

FIG. 5 illustrates the manner in which a number of individual fluid distributor pans are arranged around the centerpipe 2 to form a discoid layer which separates the volume of the outer vessel 1 which is above this layer from the volume which is below this layer. A single fluid transfer conduit 6 connects to the annular fluid distribution ring 3 with the smaller fluid distribution pipes 5 radiating outward from the annular ring. The fluid distribution pipes extend to a point above the distributor 17. In this view it may be seen that the side plates of adjacent fluid distributor pans are in close proximity. It is preferred that a gap of between 1.0 and 1.5 cm is provided between adjacent fluid distribution pans. This is to allow a gradual settling of solid particles downward from particle bed to particle bed to fill in void spaces. Extra particles may be added at the top bed if desired. This gap could be sealed or eliminated if desired. If an unsealed gap is provided, it is preferred that the pans of different layers are aligned such that gaps on vertically adjacent layers are not over one another. This slow particle migration does not result in a moving bed of solids but simply keeps the beds packed.

The one embodiment of the invention which is depicted in these five Figures is presented for purposes of illustration and is not intended to exclude from the scope of the subject invention those other embodiments set out herein or which may result from normal and reasonable modification of those embodiments. As is easily recognized by one skilled in the art, these Drawings have been simplified in an attempt to clearly illustrate the main elements of the invention and various accouterments of such process vessels such as manways, welds, internal supports and bracing, and vents have not been shown.

The number of fluid distributor pans utilized at any one level in the apparatus is expected to be between 15 and 30, with 20 being a representative number for rather large-scale commercial vessels. If a separate fluid distribution pipe is utilized for each fluid distributor pan, it is necessary to make a very large number of holes in the fluid distribution ring. This may severely weaken the fluid distribution ring and be a less desirable design. To lessen the number of required pipes, it is preferred that a single fluid distribution pipe is used to service from two to four adjacent fluid distributor pans. Each pipe therefore preferably radiates outward from the fluid distribution ring at a point above the side plates of the adjacent fluid distributor pans. This fluid distribution pipe would then branch into two conduits attached to the distributors of these two fluid distributor pans.

The subject apparatus may be viewed as comprising either a number of individual fluid distributor pans which are considered individual units or as comprising a smaller number of horizontal liquid distribution means each of which comprises enough fluid distributor pans to form one layer across the vessel. That is, each of these layers of fluid distributor pans can be considered an element of an overall apparatus. One embodiment of the invention may therefore be characterized as a liquid-solids contacting apparatus which comprises an enclosed outer vessel having a vertical major axis and comprising a cylindrical horizontal outer wall; a vertical imperforate centerpipe located within the outer vessel and concentric with the major axis of the outer vessel; a plurality of vertically spaced apart horizontal liquid distribution means, each liquid distribution means being in the form of a discoid ring extending between the centerpipe and the horizontal outer wall of the vessel, there being provided means within the liquid distribution means allowing the vertical flow of liquid upward or downward through the liquid distribution means between any two points located between the uppermost and lowermost liquid distribution means while preventing the vertical flow of solid particles through the liquid distribution means, the liquid distribution means comprising horizontal flow diversion plates which channel liquid flowing vertically through the liquid distribution means into a mixing area located in the middle one-third of the distance between the centerpipe and the horizontal outer wall of the vessel; and means to add or withdraw liquid at said mixing area of the liquid distribution means.

A second broad embodiment of the invention may be characterized as a fluid-solids contacting apparatus which comprises an enclosed outer vessel having a vertical major axis and comprising a cylindrical horizontal outer wall; a vertical centerpipe located within the outer vessel and aligned with the major axis of the outer vessel; a plurality of vertically spaced apart horizontal layers of fluid distributor pans, each layer being in the form of a discoid ring extending between the centerpipe and the horizontal outer wall of the vessel, and which each fluid distributor pan being a wedge-shaped structure having a first end adjacent the centerpipe and a second end adjacent the horizontal outer wall of the vessel and comprising (i) two imperforate side plates extending between the centerpipe and the horizontal outer wall; (ii) an upper screen extending horizontally from side to side between the side plates; (iii) a lower screen extending horizontally from side to side between the side plates; and (iv) a first and a second imperforate flow diversion plates extending horizontally from side to side between the side plates and located between and spaced apart from the upper screen and the lower screen; the first and the second flow diversion plates being at substantially the same elevation with the first flow diversion plate being separated from the second flow diversion plate by a substantially uniform gap which extends from side to side across the fluid distributor pan at a point between the first and second ends of the fluid distributor pan; and fluid transfer means communicating with each fluid distributor pan at said gap between the first and the second flow diversion plates and extending to a point outside of the outer vessel.

It is preferred that the fluid transfer means of the above embodiment is similar to those elements previously described and communicates with the volume between the upper screen and the lower screen through a perforated horizontal conduit located above the gap between the flow diversion plates which extend from side to side across the fluid distributor pan. It is also preferred that the fluid transfer means comprises a fluid distribution pipe extending from each fluid distributor pan to an annular fluid distribution ring mounted on the centerpipe, with there being a separate fluid distribution ring for each layer of fluid distributor pans, and that the annular fluid distribution ring is located above the layer of fluid distributor pans with which it is in communication.

When used in the preferred embodiment of providing a segmented bed of adsorbent for use in a simulated moving bed separation process, each of the larger fluid distribution conduits extends outside of the vessel and is connected to the rotary valve or valve manifold system which is utilized for changing the positions at which various process streams enter and leave the adsorbent bed. The annular volumes provided within the vessel between the layers of fluid distributor pans are filled with the granular adsorbent. A feed stream enters the apparatus at one of the many possible entry points defined by the horizontal fluid transfer conduits and flows into the adsorbent bed through the annular distribution ring, distribution pipes and distributor pans. The feed stream then flows, preferably downward, through several annular volumes of the adsorbent with the downward flowing stream being admixed at each passage through a layer of fluid distributor pans. The unadsorbed components of the feed stream are removed from the apparatus by being allowed to flow into one layer of fluid distributor pans and then into the corresponding fluid distribution pipes, fluid distribution ring and outward through the horizontal fluid transfer conduit to a point outside the apparatus. This process stream is normally referred to as a raffinate stream. The raffinate stream and other streams leaving the apparatus return to the rotary valve or valve manifold system. At the same time a different process stream referred to as a desorbent stream is passed into the apparatus at a different point through a different fluid transfer conduit and in a similar manner is distributed across the cross section of the apparatus through the liquid distribution means. The desorbent stream serves to remove from the adsorbent particles those components of the feed stream which were previously adsorbed onto the particles. The desorbent stream thus acquires those components lost by the feed stream and is removed from the apparatus as a process stream referred to as the extract stream. It is also common practice to have one or more other zones utilized within a simulated moving bed adsorption process, with streams referred to as flush streams or washing streams passing through these zones to remove residual components of the feed or desorbent streams from the interstitial volumes of the adsorbent bed. In some simulated moving bed processes, including processes for the separation of fructose and glucose, a purification zone is employed. For instance purification may be achieved by passing a portion of the extract stream into the purification zone at the purification zone's upstream boundary with this material flowing through the adsorbent and displacing raffinate material from the pore volume or surfaces of the adsorbent particles.

Although adsorptive separation processes can be operated with both vapor phase and liquid phase conditions, the use of liquid phase conditions is preferred. Both the adsorption and desorption operations are preferably performed at essentially the same conditions. Adsorption-promoting conditions preferably include a pressure sufficient to maintain all of the chemical compounds present in the adsorbent bed as liquids. A pressure of from atmospheric to about 50 atmospheres may be employed with the pressure preferably being between 1.0 and 32 atmospheres gauge. Suitable operating temperatures range from about 20° to about 250° C., with temperatures between 40° and 100° C. being preferred.

The subject apparatus may be constructed from the normal materials utilized for similar vessels and apparatus after consideration of the standard design and safety codes and guidelines. The outer vessel may be fabricated from a synthetic material such as a fiber-reinforced resin or plastic, but it is preferred that the outer vessel and all of the internal components of the apparatus are fabricated from steel. The environments present in most separation processes do not present severe corrosion or erosion problems. However, for the separation of monosaccharides or other applications in which the apparatus may produce a product destined for use in a food, it is preferred that the outer vessel in the internal components of the apparatus are fabricated from stainless steel.

It should be noted that during the simulation of a moving bed operation the streams leaving the vessel at intermediate points, e.g. the extract stream, are only a part of the overall vertical flow through a vertical vessel. The remainder of the flow is maintained by a "pumparound" loop connecting the top and the bottom of the vessel. The fluid flow through the uppermost and lowermost fluid transfer conduits 6 is therefore unidirectional as shown on FIG. 1 of the Drawing.

I claim as my invention:

1. A fluid-solids contacting apparatus which comprises:
   (a) an enclosed outer vessel having a vertical major axis and comprising a cylindrical vertical outer wall;
   (b) a vertical centerpipe located within the outer vessel and aligned with the major axis of the outer vessel;
   (c) a plurality of vertically spaced apart horizontal layers of fluid distributor pans containing adsorbent particles, each layer being in the form of a flat ring extending between the centerpipe and said vertical outer wall of the vessel;
   (d) a plurality of annular fluid distribution rings mounted on the centerpipe at points intermediate vertically adjacent layers of fluid distributor pans;
   (e) fluid distribution pipes extending from each fluid distributor pan to said annular fluid distribution rings; and,
   (f) fluid transfer conduits extending from the annular fluid distribution rings to points outside of the outer vessel for passage of fluid into and out of said vessel.

2. The apparatus of claim 1 further characterized in that the fluid distribution pipes connect the fluid distributor pans to an annular fluid distribution ring located above the fluid distributor pans.

3. The apparatus of claim 2 further characterized in that the fluid transfer conduits extend substantially horizontally from the annular fluid distribution rings to points outside of the outer vessel for passage of fluid into and out of said vessel.

4. The apparatus of claim 3 further characterized in that a single fluid transfer conduit for passage of fluid into and out of said vessel is connected to each fluid distribution ring.

5. The apparatus of claim 1 further characterized in that the vertical centerpipe is imperforate.

6. A fluid-solids contacting apparatus which comprises:
   (a) an enclosed outer vessel having a vertical major axis and comprising a cylindrical vertical outer wall;
   (b) a vertical centerpipe located within the outer vessel and aligned with the major axis of the outer vessel;
   (c) a plurality of vertically spaced apart horizontal layers of fluid distributor pans containing adsorbent particles, each layer being in the form of a discoid ring extending between the centerpipe and the vertical outer wall of the vessel and comprising a plurality of distributor pans, and with each fluid distributor pan being a wedge-shaped structure having a first end adjacent the centerpipe and a second end adjacent said vertical outer wall of the vessel and comprising:
      (i) two imperforate side plates extending between the centerpipe and said vertical outer wall;
      (ii) an upper screen extending horizontally from side to side between the side plates;
      (iii) a lower screen extending horizontally from side to side between the side plates; and,
      (iv) a first and a second imperforate flow diversion plates extending horizontally from side to side between the side plates and located between and spaced apart from the upper screen and the lower screen; the first and the second flow diversion plates being at substantially the same elevation with the first flow diversion plate being separated from the second flow diversion plate by a substantially uniform gap which extends from side to side across the fluid distributor pan at a point between the first and second ends of the fluid distributor pan; and,
   (d) fluid transfer means comprising a fluid distribution pipe extending from each fluid distributor pan to an annular fluid distribution ring mounted on said centerpipe, wherein a separate fluid distribution ring is provided for each layer of fluid distributor pans communicating with each fluid distributor pan at said gap between the first and the second flow diversion plates and also communicating with the volume between said upper and lower screen through a perforated horizontal conduit located above said gap and extending from side to side across said fluid distributor pan and extending to a point outside of the outer vessel for passage of fluid into and out of said vessel.

7. The apparatus of claim 6 further characterized in that an imperforate plate located below said gap forms a part of the fluid distributor pan.

8. The apparatus of claim 8 further characterized in that said gap is located in the middle one-third of the distance between the first and the second ends of the fluid distributor pan.

9. A liquid-solids contacting apparatus which comprises:
   (a) an enclosed outer vessel having a vertical major axis and comprising a cylindrical vertical outer wall;

(b) a vertical imperforate centerpipe located within the outer vessel and concentric with the major axis of the outer vessel;

(c) a plurality of vertically spaced apart horizontal liquid distribution means containing adsorbent particles, each liquid distribution means being in the form of a discoid ring extending between the centerpipe and the vertical outer wall of the vessel, there being provided means within the liquid distribution means allowing the vertical flow of liquid upward or downward through the liquid distribution means between any two points located between the uppermost and lowermost liquid distribution means while preventing the vertical flow of solid particles, the liquid distribution means comprising horizontal flow diversion plates which channel liquid flowing vertically through the liquid distribution means into a mixing area located in the middle one-third of the distance between the centerpipe and the vertical outer wall of the vessel; and, (d) means to add or withdraw liquid at said mixing area of the liquid distribution means from or to the outside of said vessel comprising annular liquid distribution rings mounted on said centerpipe, a plurality of liquid distribution pipes connecting said annular liquid distribution rings to a multiplicity of points on a single liquid distribution means and a substantially horizontal liquid transfer conduit extending from each annular liquid distribution ring to a point outside of the outer vessel.

10. The apparatus of claim 9 further characterized in that the liquid distribution means comprises a number of adjacent wedge-shaped subassemblies each of which comprises substantially horizontal upper and lower particle retention screens and two imperforate flow diversion plates located between and spaced apart from the upper and lower screens, with the flow diversion plates being in the same horizontal plane and being separated by a substantially uniform gap which abuts said mixing area.

11. The apparatus of claim 10 further characterized in that said mixing area extends around the centerpipe and has the shape of a polygon when viewed from above.

* * * * *